United States Patent [19]

Frank

[11] Patent Number: 5,449,057
[45] Date of Patent: Sep. 12, 1995

[54] ONE-WAY CLUTCH APPARATUS

[76] Inventor: Arthur R. Frank, 4827 Linwood Dr., West Bloomfield, Mich. 48324

[21] Appl. No.: 179,105

[22] Filed: Jan. 10, 1994

Related U.S. Application Data

[63] Continuation-in-part of Ser. No. 143,485, Oct. 26, 1993, abandoned.

[51] Int. Cl.⁶ .................. F16D 11/00; F16D 41/12
[52] U.S. Cl. .................... 192/46; 192/67 R; 192/108
[58] Field of Search .............. 192/46, 45.2, 43.1, 192/108, 45.1, 41 R, 42, 71, 72, 73, 105 CD, 105 R, 103 B, 67 R

[56] References Cited

U.S. PATENT DOCUMENTS

| | | | |
|---|---|---|---|
| 1,163,298 | 12/1915 | Winkler | 192/41 R |
| 2,226,247 | 12/1940 | Lesage | 192/46 X |
| 2,323,353 | 7/1943 | Plog | 192/46 |
| 3,461,746 | 8/1969 | Schwerdhöfer | 192/103 B X |
| 3,511,348 | 5/1970 | Jonsson et al. | 192/43.1 |
| 3,532,198 | 10/1970 | Lederman | 192/45.1 |
| 3,844,391 | 10/1974 | Hallerberg | 192/45.1 X |
| 3,938,632 | 2/1976 | Giese et al. | 192/45.1 |
| 3,997,041 | 12/1976 | Judd et al. | 192/45.1 X |
| 4,548,304 | 10/1985 | Nagata | 192/71 X |
| 4,635,502 | 1/1987 | George | 192/43.1 X |
| 4,711,331 | 12/1987 | Hoffmann | 192/46 |
| 5,004,083 | 4/1991 | Lohman | 192/46 |
| 5,024,308 | 6/1991 | Kinoshita et al. | 192/45.1 X |
| 5,070,978 | 12/1991 | Pires . | |

FOREIGN PATENT DOCUMENTS

| | | | |
|---|---|---|---|
| 866978 | 5/1961 | United Kingdom | 192/43.1 |
| 869052 | 5/1961 | United Kingdom | 192/46 |
| 1598908 | 9/1981 | United Kingdom | 192/46 |

Primary Examiner—Rodney H. Bonck
Attorney, Agent, or Firm—Harness, Dickey & Pierce

[57] ABSTRACT

A one-way clutch generally comprising a driving member, a carrier ring and a driven member. The carrier ring is disposed concentrically with the driving and driven members and disposed therebetween. The carrier ring includes at least one cut-out within which a key is disposed for pivotal rotation relative to the carrier ring. Each of the driving and driven members further include a plurality of circumferentially spaced key engaging notches. When the driving member rotates in a first rotational direction one end of the key engages with one of the key engaging notches within the driving member. Subsequently, a second outer end portion of the same key engages with one of the key engaging notches in the driven member. This allows the driving member to drive the driven member through the single engaged key. When the driving member is rotated in the opposite rotational direction, the driving member urges the engaged key out of engagement with the key engaging notch with which it was previously engaged and thereafter moves freely in an over-running running condition without engaging the key. The apparatus is particularly well adapted and well adapted for high rpm applications. In a preferred embodiment the arm portions of the key are offset from a longitudinal center of the main body portion to enable centrifugal force to urge one end of the key outwardly into locking engagement with one or more driven members. In this embodiment the carrier ring acts as the driving member.

8 Claims, 3 Drawing Sheets

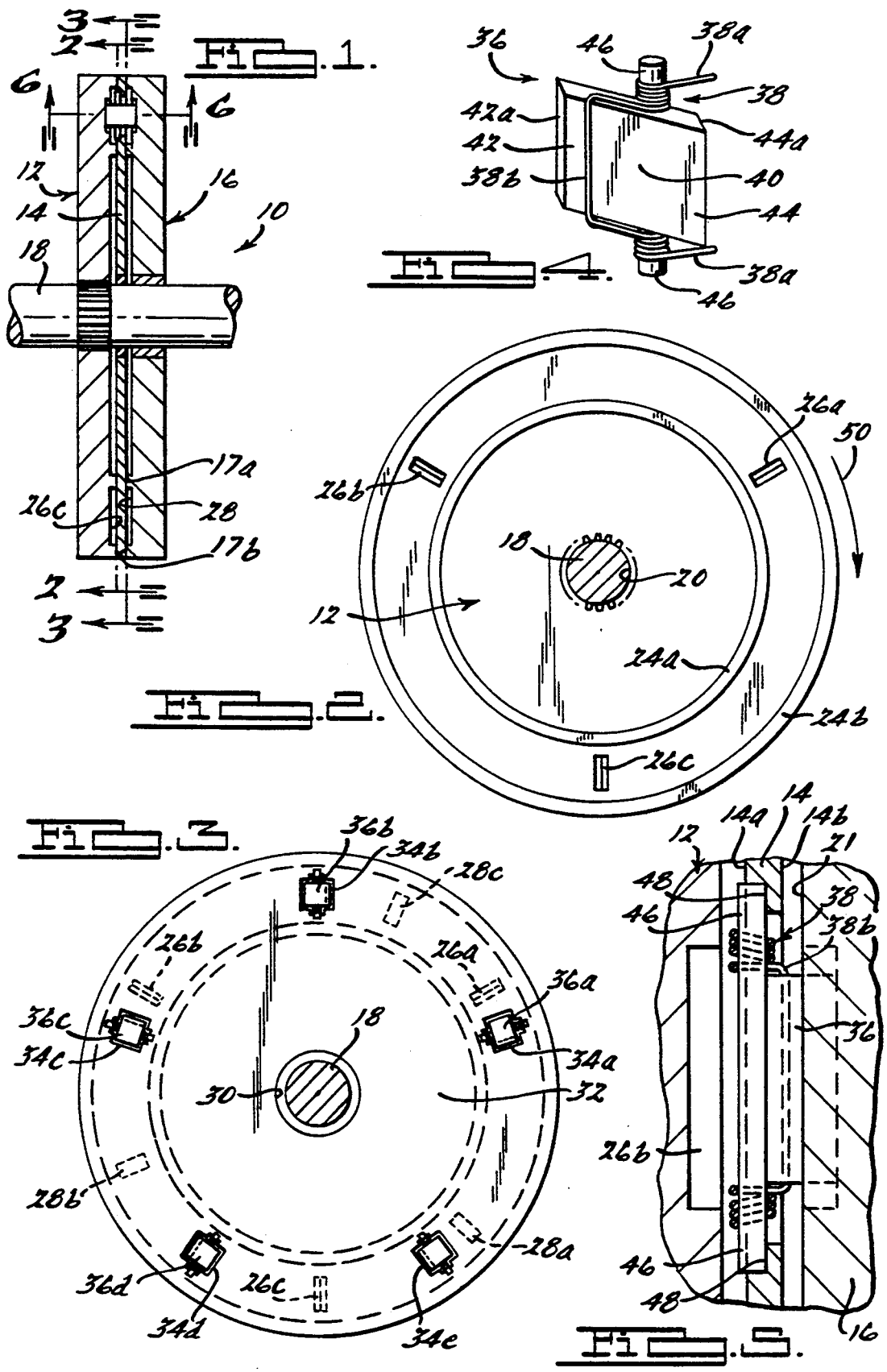

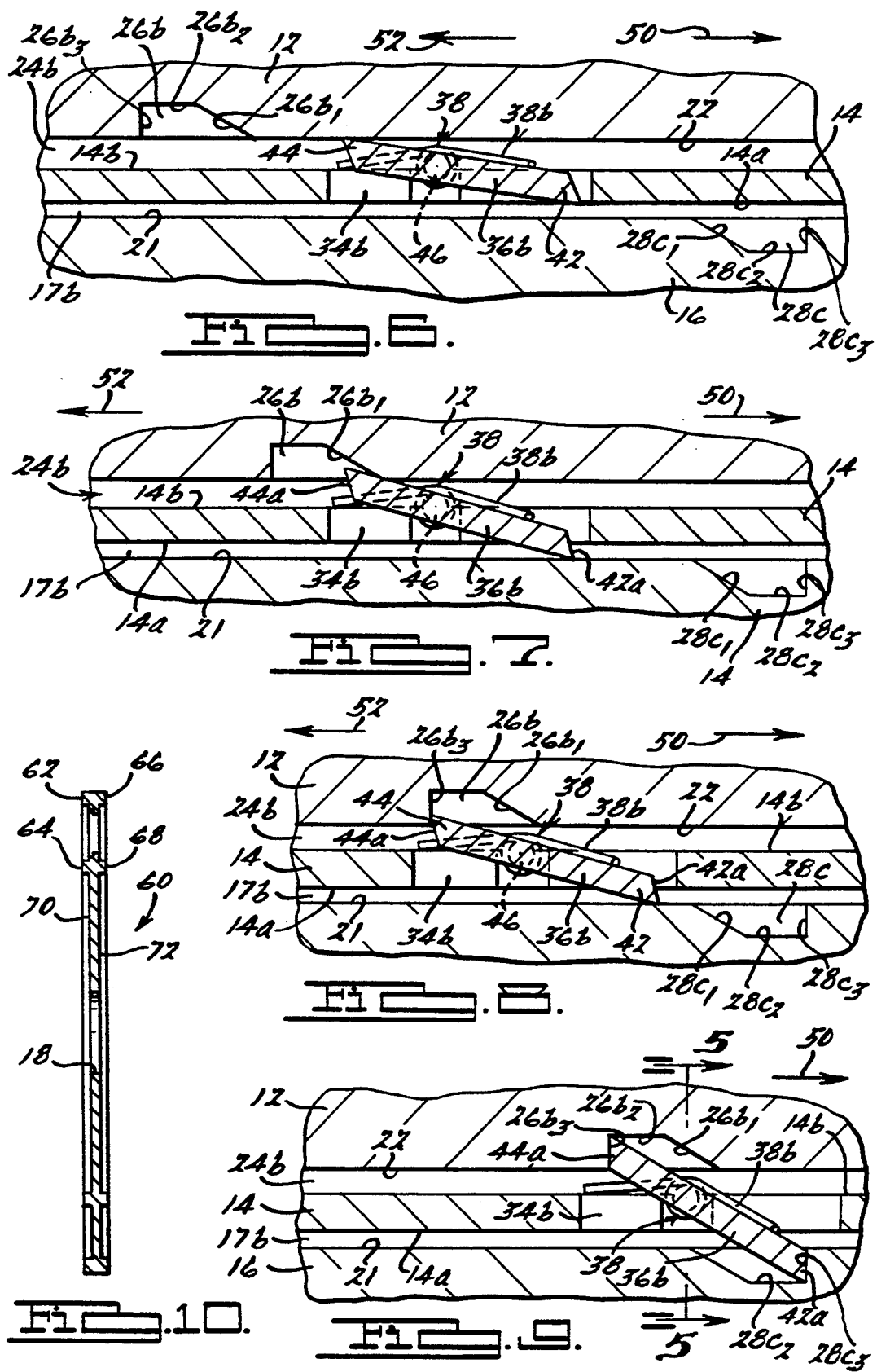

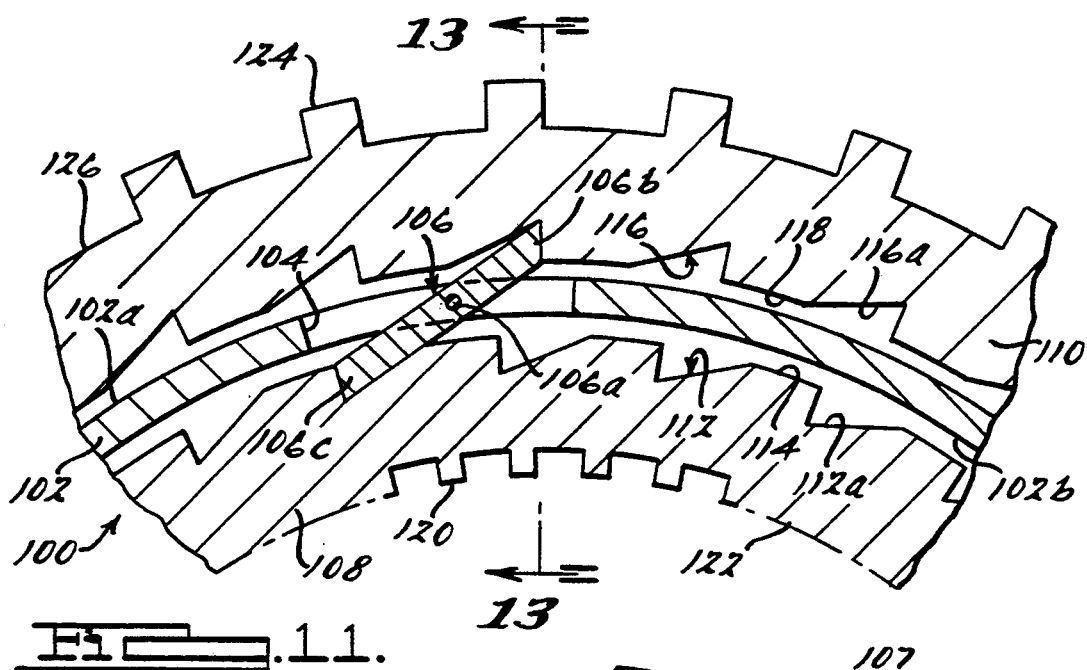
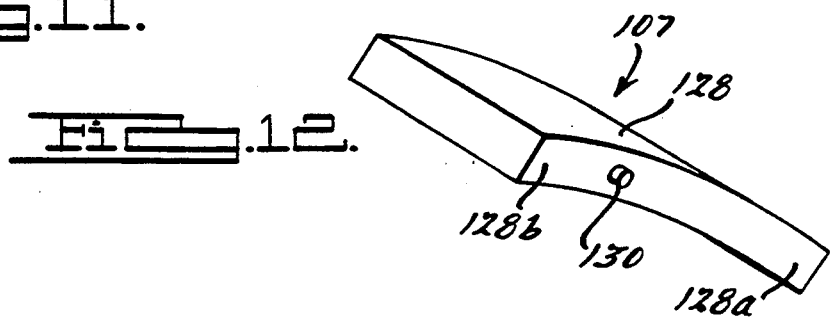
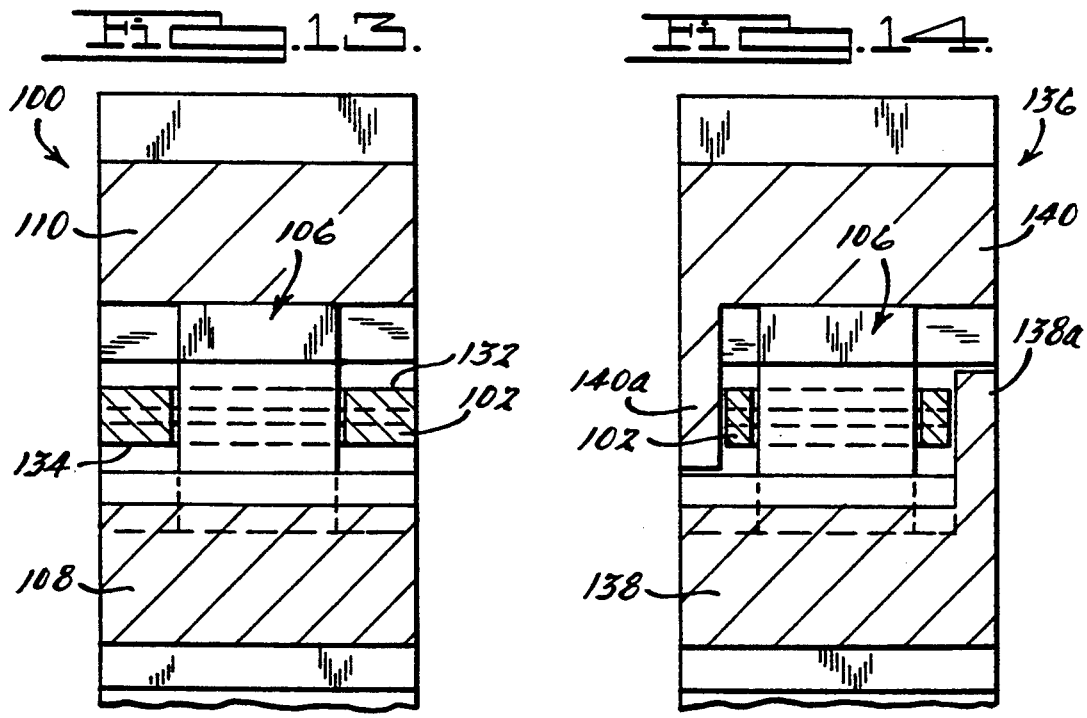

ONE-WAY CLUTCH APPARATUS

CROSS REFERENCE TO RELATED APPLICATION

This application is a Continuation-In-Part application of U.S. application Ser. No. 08/143,485, filed Oct. 26, 1993, now abandoned.

TECHNICAL FIELD

This invention relates to clutches, and more particularly to a one-way clutch apparatus.

DISCUSSION

Clutches are used in a wide variety of applications to selectively couple power from an input member, such as a driving disk or plate, to a second independently rotatable member such as a driven plate or disk. In some applications, it is further desirable to incorporate a clutch which allows for rotational movement of the driving member in a second rotational direction in which no clutch engagement occurs, and therefore in which no rotation of the driven member occurs. Such clutches are commonly referred to as "one-way" clutches. With a one-way clutch, when a driving member is rotated in a first direction, the clutch causes engagement of the driving member with an external driven member. When the driving member is rotated in a second rotational direction opposite to that of the first rotational direction, the clutch releases the driven member from engagement with the driving member. The driving member is then allowed to rotate ("over-run") freely or to "free wheel" relative to the driven member.

Previously designed one-way clutches typically include some form of "strut" which is positioned in a notch formed in either the driving member or the driven member. The strut typically "floats" in the notch during operation. While this design has proven to be a success and to work satisfactorily in many applications, it would nevertheless be even more desirable to provide a one-way clutch having some form of strut-like member which is more positively supported, and which does not "float" with respect to its supporting plate, but rather which "rotates" between engaged and disengaged positions relative to its supporting plate. Such an apparatus would be even more stable at higher rpm applications such as those in connection with transmissions being used with aircraft engines.

Yet another area where even further improvements over previously designed one-way clutches would be desirable is in connection with providing a strut-like engaging element for a one-way clutch which is not as critically dependent upon a copious amount of lubricant, such as oil, for proper operation. With previously designed one way clutches it is critically important that the pockets in the plate within which the strut is disposed be very well lubricated. This lubrication requirement becomes more difficult to satisfy as the transmission or other apparatus within which the one-way clutch is disposed is orientated in different angles, such as when a vehicle or aircraft associated with the transmission incorporating the one-way clutch changes its attitude relative to the earth's surface. In such instances there may be momentary lapses of lubrication to the notches wherein the struts are housed. These lapses, in some extreme instances, could adversely impact the wear of the one-way clutch.

Accordingly, it is a principal object of the present invention to provide a one-way clutch apparatus which is adapted to couple a driving member with a driven member when the driving member is moved in a first rotational direction, and to allow the driving member to be moved freely relative to the driven member when the driving member is moved in a second rotational direction.

It is yet another object of the present invention to provide a one-way clutch having an engaging element which does not "float" in a related supporting member but is instead more positively supported for rotational movement relative to its supporting member, and which therefore is more stable in higher rpm applications.

It is yet another object of the present invention to provide a one-way clutch apparatus which is more immune to undesirable operating characteristics caused by a temporary lack of lubricant to the areas adjacent its engaging element, to thereby permit the one-way clutch to be used in applications where a transmission within which it is operating can be operated in a variety of attitudes relative to the earth's surface without fear of a momentary lack of lubricant to the one-way clutch adversely affecting the wear and tear on the one-way clutch.

It is still another object of the present invention to provide a one-way clutch apparatus which is adapted for use with concentrically disposed inner and outer annular ring members such as annular gears to allow one of the concentrically disposed gears to drive the other when rotated in a first direction and to allow the two concentrically disposed gears to be uncoupled from one another when the former gear is driven in an over-running direction.

SUMMARY OF THE INVENTION

The above and other objects are provided by a one-way clutch apparatus in accordance with preferred embodiments of the present invention. The apparatus generally includes a carrier plate having a cut-out portion and an engaging element in the form of a key supported within the cut-out portion for pivotal or rotational movement about a central axis of the key. Biasing means is further included for biasing the key such that first and second ends of the key are continuously urged outwardly of the carrier plate.

In the preferred embodiment the carrier plate is used in connection with a driving member having a key engaging portion formed in a surface thereof which faces the carrier plate, and with a driven member having a key engaging portion in a surface thereof which also faces the carrier plate. Accordingly, the carrier plate is disposed generally parallel between the driving and driven members. The key engaging portions of each of the driven and driving members are further disposed the same distance away from the axis of rotation of each of the members, and further the same distance from the axis of rotation as the key is disposed from the axis of rotation of the carrier plate. Accordingly, at some time during rotation of the driving member the key engaging portion therein will move directly over the key of the carrier plate. Since the carrier plate, driving member and driven member each rotate about a common axis, as the key in the carrier plate rotates it will at some time position itself over the key engaging portion of the driven member.

When the driving member is rotated in a first rotational direction, at some point during rotational movement thereof the key engaging portion moves directly over the key in the carrier plate. A first end portion of the key is urged into engagement with the key engaging portion in the driving member by the force of the biasing means, which in the preferred embodiment is in the form of a coil spring operably associated with the key. Engagement of the first end portion of the key in the key engaging portion of the driving member causes the carrier plate to begin moving rotationally with the driving member in the first rotational direction. As the key (and carrier plate) is moved rotationally to a position over the key engaging portion of the driven member the biasing force of the spring causes further rotational movement of the key itself such that a second end portion of the key engages or "drops into" engagement with the key engaging portion in the driven member. The driving member, carrier plate and driven member then all rotate in the first rotational direction with the key positively coupling the driving action of the driving member to the driven member.

When the driving member is moved in a second rotational direction opposite to that of the first rotational direction, the first end portion of the key will be urged rotationally out of engagement with the key engaging portion of the driving member. The driving member is then allowed to over-run (i.e., rotate freely) in the second rotational direction without driving engagement with the key, and therefore without engagement with the driven member. Thus, the driving member can "free wheel" in the second rotational direction while the carrier plate and driven member remain stationary, or relatively stationary.

In an alternative preferred embodiment of the present invention the carrier plate is in the form of a carrier ring which is interposed concentrically between an inner annular ring and an outer annular ring. The carrier ring includes at least one cut-out portion within which a key is disposed for pivotal movement therein. Each of the inner and outer rings include at least one notched portion therein which is adapted to engage one or the other of the ends of the key.

When the outer ring, for example, is rotating in an over-running direction the key does not engage with the notch therein. Accordingly, rotation of the outer ring and the over-running direction does not impart any driving action to either the carrier ring or the inner ring. However, when the outer ring, for example, is rotated in the rotational direction opposite to that of the over-running direction, the key in the carrier is caused to engage the notch in the outer ring. As this occurs the carrier ring is driven rotationally concurrently with the outer ring for at least a short distance before engaging the notch in the inner ring. At this point the key transmits the full driving force of the outer ring to the inner ring thus causing the inner ring to rotate concurrently with the outer ring. It will be appreciated that the inner ring could just as easily be used as the driving ring in the outer ring as the driven ring. The principles of operation of the present invention are not dependent upon which of the inner or outer rings are used at the driving or driven ring.

The alternative embodiment just described above thus allows two concentrically disposed ring members such as annular gears to be driven together when one or the other is driven in one direction, and to be drivingly uncoupled when one or the other is rotated in the opposite rotational direction.

In the alternative preferred embodiment described above the key may be spring biased such that its outermost ends extend slightly outwardly of the inner and outer surfaces of the carrier ring. Alternatively, the key may be formed such that its axis of pivotal movement is off center towards one of the outermost ends. This causes one of the outermost ends to be urged outwardly by a centrifugal force as the carrier ring rotates in one direction, and allows gravity to urge one of the ends outwardly of the carrier ring when the carrier ring is substantially stationary. Thus, the need for some independent biasing means such as a spring is obviated.

Other objects, advantages and features of the present invention will become apparent to one skilled in the art upon reading the following description and dependent claims, taken in conjunction with the following wings.

BRIEF DESCRIPTION OF THE DRAWINGS

The various advantages of the present invention will become apparent to one skilled in the art by reading the following specification and subjoined claims and by referencing the following drawings in which:

FIG. 1 is a cross-sectional side view of a one-way clutch in accordance with a preferred embodiment of the present invention showing the apparatus coupled to a drive shaft adapted to supply a "motive" or driving power to a driving member of the apparatus;

FIG. 2 is a view of the driving member taken in accordance with section line 2—2 of FIG. 1;

FIG. 3 is a view of the carrier plate taken in accordance with section line 3—3 of FIG. 1;

FIG. 4 is an elevational perspective view of the key and coil spring of the one-way clutch of the present invention;

FIG. 5 is a cross-sectional view of the apparatus taken in accordance with section line 5—5 in FIG. 9;

FIG. 6 is a view of the apparatus in accordance with section line 6—6 of FIG. 1, showing one key of the carrier plate disengaged with both the driving member and the driven member;

FIG. 7 shows the apparatus of FIG. 6 as the driving member is moved rotationally in a first rotational direction such that the key of the carrier plate begins to engage the key engaging portion of the driving member;

FIG. 8 is a view of the apparatus of FIG. 7 showing the key abuttingly engaging the wall portion of the driving member as the driving member continues to rotate in the first rotational direction;

FIG. 9 is view of the apparatus of FIG. 8 showing the key of the carrier plate fully engaged with the wall portion of the driving member and with the wall portion of the driven member, thereby allowing the driving member to transmit a driving force through the key to drive the driving member;

FIG. 10 is a cross sectional side view of an alternative preferred embodiment of the carrier plate including raised thrust shoulders thereon;

FIG. 11 is a fragmentary cross sectional view of an alternative preferred embodiment of the present invention showing the carrier member in the form of a carrier ring disposed concentrically between concentrically disposed inner and outer races;

FIG. 12 is a perspective view of an alternative preferred form of the key shown in FIG. 11;

FIG. 13 is a cross sectional view of the assembly shown in FIG. 11 in accordance with section line 13—13 therein; and FIG. 14 is a view of an alternative preferred form for the inner and outer races of FIG. 13.

DETAILED DESCRIPTION OF THE PREFERRED EMBODIMENTS

Referring to FIG. 1, there is shown a one-way clutch apparatus 10 in accordance with a preferred embodiment of the present invention. The apparatus 10 generally includes a driving member 12 in the form of a drive plate or disk, a carrier plate 14 in the form of a plate or disc, and a driven member 16 in the form of a driven plate or disk. For purposes of illustration, the driving plate 12 is shown splined to a drive shaft 18 such that rotational movement of the drive shaft 18 causes a corresponding rotational movement of the driving member 12. Also for purposes of illustration, the carrier plate 14 and driven member 16 are shown concentrically disposed about the drive shaft 18 such that each is free to remain stationary when the one-way clutch 10 is not engaged. It will be appreciated that the driving member 12 and driven member 16 could just as easily be switched such that member 16 imparts a motive force to member 12. Furthermore, it should be appreciated that one or the other of the members 12 and 16 could be a stationary component within a transmission or other like mechanism and that applications will be readily recognized by those of ordinary skill in the art which involve minor variations of the embodiment illustrated in FIG. 1, but which still clearly fall within the scope of the appended claims.

With brief reference to FIG. 2, the driving member 12 is illustrated. The driving member 12 generally includes an aperture 20 which as shown may include a plurality of teeth for engaging the splined drive shaft 18. It will be appreciated that other forms of engagement between a driving shaft and the driving member 12 could easily be used in lieu of the toothed arrangement shown in FIG. 2.

The driving member 12 includes an inner face 22 having a pair of concentrically disposed, raised thrust shoulders 24a and 24b thereon. Between the thrust shoulders 24a and 24b are a plurality of key engaging notches 26a, 26b and 26c. It will be appreciated that a greater or lesser number of key engaging notches could just as well be used if so desired. The greater the number of key engaging notches 26 used the more quickly the apparatus 10 will become engaged when the driving member 12 is rotated in a first rotational direction, while the lesser the number of key engaging notches 26 used the less quickly the apparatus 10 will become engaged.

With reference to FIG. 6, the key engaging notch 26b is shown in a side cross-sectional view. Key engaging notch 26b includes, as do notches 26b and 26c, an angled wall portion 26$b_1$, a bottom-most portion 26$b_2$, and a wall portion 26$b_3$. The degree of incline of the angled wall portion 26$b_1$, may vary somewhat but is preferably within the range of about 15° to 45° from the interface 22 of the driving member 12, and more preferably about 15°-30° relative to the surface of the inner face 22.

With further reference to FIGS. 1 and 6, it will be appreciated that the driven member 16 also preferably includes a plurality of key engaging notches 28, and a pair of raised thrust shoulders 17a and 17b. While a plurality of notches 28 is preferred, it should also be realized that the apparatus 10 could easily operate with just a single key engaging notch 28 if so desired. By using a plurality of key engaging notches 28, the degree of rotational travel of the driving member 12 and the carrier plate 14 before the apparatus 10 becomes engaged is reduced. In the preferred embodiment of the apparatus 10, the driven member 16 includes three key engaging notches 28a, 28b and 28c (each being illustrated in phantom in FIG. 3 to illustrate an exemplary orientation relative to the notches 26 and keys 36). Again, however, a greater or lesser number of notches 28 could be formed in the driven member 16 depending upon the needs of a particular application and the amount of "play" desirable in the apparatus 10 before same becomes engaged. With brief reference again to FIG. 6, the key engaging notch 28b of the driven member 16 forms a notch which is preferably identical to each of notches 26. Accordingly, key engaging notch 28a likewise includes an angled wall portion 28$a_1$, a bottom portion 28$a_2$ and a wall portion 28$a_3$.

With further reference to FIG. 1, it will also be noted that each of the notches 26 and 28 are formed at equal distances from the axis of rotation of each of their members 12 and 16, respectively. Accordingly, as the driving member 12 and carrier plate 14 rotate during operation of the apparatus 10, the notches 26 will, at some point during rotation of the driving member 12, be aligned over the notches 28, thus allowing the apparatus 10 to become engaged and disengaged, as will be explained more fully momentarily.

With reference to FIG. 3, the carrier plate 14 is shown. The carrier plate includes an aperture 30 formed in a central portion 32 thereof, and a plurality of circumferentially spaced cut-out portions 34a, 34b, 34c, 34d and 34e within which are disposed a corresponding plurality of engaging elements in the form of keys 36a, 36b, 36c, 36d, 36e. Again, it will be appreciated that a greater or lesser number of keys could be incorporated into the carrier plate 14 with a greater number causing quicker engagement of the apparatus 10 and a lesser number causing less quick engagement of the apparatus 10. In FIG. 3, it will also be noted that the key engaging notches 26a, 26b and 26c are positioned relative to the keys 36 such that no portion of any two keys can possibly engage any two of notches 26a, 26b, 26c at any given time. This will also be explained more fully in connection with the explanation of operation of the apparatus 10. The cut-outs 34 are further spaced circumferentially about the axis of rotation of the carrier plate 14, which is represented by the very center of the drive shaft 18, so as to be positioned between the key engaging notches 26 in the driving member 12 and the key engaging notches 28 in the driven member 16 when assembled between the members 12 and 16.

With brief reference to FIG. 4, one of the keys 36c is shown, together with a biasing means in the form of a coil spring 38 for biasing the key 36c into engagement with the key engaging notches 26 and 28. Key 36c is identical to each of the other keys 36a, 36b, 36d and 36e illustrated in FIG. 3 and generally includes a main body portion 40 having a first end portion 42, a second end portion 44, and arm portions 46 protruding outwardly of the main body portion 40 and integrally formed with the main body portion 40. The coil spring 38 includes end portions 38a and a central portion 38b which fits over a portion of the main body portion 40 to provide a constant biasing force on the main body portion 40 which tends to constantly urge the main body portion 40 rotatably about the arm portions 46. The first and second end portions 42 and 44 each include a chamfered portion 42a and 44a, respectively, which helps facilitate smooth engagement of the first and second end portions 42 and 44 into the key engaging notches 28 and 26.

With reference to FIG. 5, the key 36c can be seen in assembly relation with the driving member 12, the carrier plate 14 and the driven member 16. The arm portions 46 of the key 36c are adapted to rest in grooves 48 formed in the carrier plate 14 on opposing sides of the cut-out 34c. Accordingly, the key 36c is able to rotate pivotally about its arms 46 between a first position, wherein the main body portion 40 of the key 36c is almost parallel to the central portion 32 of the carrier member 14, to a second position wherein the first and second end portions 42 and 44, respectively, are protruding outwardly from opposing sides 14a and 14b of the carrier plate 14. The end portions 38a of the coil spring 38 are adapted to rest on the surface 14a of the carrier plate 14 adjacent the cut-out portion 34c, as shown in FIGS. 6 through 9. Thus, the end portions 38a and the central portion 38b provide a biasing force which tends to constantly urge the first and second end portions 42 and 44, respectively, of the key 36c rotationally such that each protrudes outwardly of the surfaces 14a and 14b of the carrier plate 14. It should be appreciated, moreover, that the key 36c is merely one embodiment of many forms of keys that could be implemented with the apparatus 10 without departing from the scope of the appended claims. Those of ordinary skill in the art will appreciate that a wide variety of keys could be formed which are easily adaptable to be supported within the carrier plate.

Turning now to FIGS. 6–9, a description of the operation of the one-way clutch apparatus 10 of the present invention will be provided. FIG. 6 illustrates the apparatus 10 in its disengaged position wherein the key 36b, by example, is not engaged with either of the key engaging notches 26b or 28c. Thus, as the driving member 12 is moved rotationally in accordance with directional arrow 50 (also shown in FIG. 2) the second end portion 44 of the key 36a rides along the inner face 22 of the driving member 12 and is biased into constant engagement with the inner face 22 of the driving member 12 by the spring 38. At this point the driving member 12 is moving rotationally but little or no movement is occurring with the carrier plate 14 or the driven member 16 relative to the driving member 12. It will be noted that raised thrust surfaces 24a and 24b of the driving member (only shoulder 24b being shown in FIGS. 6–9), and the raised thrust shoulders 17a and 17b (only shoulder 17b being shown in FIGS. 6–9) maintain the carrier plate 14 at predetermined distances from the inner face 22 of the driving member 12 and the inner face 21 of the driven member 16.

Referring now to FIG. 7, as the driving member 12 is urged rotationally over the key 36b, the biasing force of the spring 38 causes the second end portion 44 of the key 36b to be urged into the key engaging notch 26b. The clearance between the carrier plate 14 and the driven member 16 allows the first end portion 42 of the key 36b to be urged just slightly outwardly of the carrier plate 14, thus allowing the second end portion 44 to protrude slightly into the key engaging notch 26b. The small amount of clearance between the surface 14b of the carrier plate 14 and the inner face 21 of the driven member 16 provided by the raised thrust shoulder 17b permit this small degree of rotational movement of the key 36b. At this point the carrier plate 14 and driven member 16 remain substantially or completely stationary while the driving member 12 continues to rotate in accordance with directional arrow 50.

Referring to FIG. 8, when the chamfered end 44a of the key 36b comes into contact with the wall portion 26b$_3$ of the key engaging notch 26b, the driving member 12 begins to urge the carrier plate 14 in the direction of directional arrow 50 as it continues to move in the first rotational direction, indicated by arrow 50. At this point the driving member 12 and the carrier plate 14 are being moved in the direction of directional arrow 50 while the driven member 16 continues to remain stationary or substantially stationary. The first end portion 42 of the key 36b continues to ride along the inner face 21 of the driven member 16.

Referring now to FIG. 9, as the driving member 12 urges the carrier plate 14 and key 36b over the key engaging notch 28c, the first end portion 42 of the key 36b is allowed to drop into engagement with the wall portion 28c$_3$ of the notch 28c in response to the biasing force of the spring 38. Smooth engagement is facilitated by the angled wall portion 28c$_1$. At this point the apparatus 10 is fully "engaged". Thereafter, continued movement in the direction of directional arrow 50 (i.e., the first rotational direction) allows the driving member 12 to impart a driving force through the key 36b to the driven member 16, thus driving the driven member 16 also in the direction of directional arrow 50. The driving member 12, the carrier plate 14 and the driven member 16 all rotate simultaneously in the direction of directional arrow 50. The degree of pivotal rotation of the key 36a may vary somewhat but is preferably within the range of about 2°–10°, and more preferably about 3° relative to the surfaces 14a and 14b of the carrier plate 14. Also, the degree of rotation of the driving member 12 before becoming fully engaged with the driven member 16 may vary, but in most instances it is expected to be relatively small. It is anticipated that, for most applications, this degree of rotation will be most preferably about 2°–10°, and most preferably about 6° before full engagement of the apparatus 10 occurs.

When disengagement of the one-way clutch apparatus 10 is desired, the description of operation with regard to FIGS. 6–9 is essentially reversed. Assuming the apparatus 10 is fully engaged as illustrated in FIG. 9, reversing the direction of rotation of the driving member 12 to a second rotational direction indicated by directional arrow 52 causes the second end portion 44 of the key 36b to engage the angled wall portion 26b$_1$, as generally indicated in FIG. 7. As the driving member 12 continues to rotate in the direction of directional arrow 52, the second end portion 44 of the key 36b is urged downwardly in the drawing of FIG. 7 towards the carrier plate 14 by the angled wall portion 26b$_1$ and then by the inner face 22 of the driving member 12. Continued rotation in the direction of directional arrow 52 by the driving member 12 will not cause engagement with any one of the keys 36a–36e. Thus, the driving member 12 "over-runs" or is free to rotate in the direction of directional arrow 52. As the driving member 12 continues to rotate in the direction of arrow 52, lubricant (i.e., oil) between the inner face 22 of the driving member 12 and the surface 14b of the carrier plate 14 causes the carrier plate 14 to begin rotating in the over-running direction of arrow 52 such that the first end 42 of the key 36b is urged smoothly out of engagement with the notch 28c. Angled wall portion 28c$_1$ helps facilitate this smooth disengagement. Thereafter the first end 42 of the key 36b will be dragged over the inner face surface 21 of the driven member 16. At actual operating speeds the rotational speed of the carrier plate 14 will be such that the first end 42 of each key 36 will not have sufficient time to "drop" into the notches 28, thus producing a smooth, generally over-running action of the carrier plate 14. As the rotational speed of the driving member increases in this direction, rotational resistance from the lubricant present between members 12 and 16 causes the carrier plate 14 to eventually attain a rotational speed which is dictated by the requirement that the frictional "drag" on each side of the carrier plate 14 be equal and opposite. When this point is reached, the speed of the carrier plate 14 will be approximately ½ the difference in speed between the driving member 12 and the driven member 14. Should the driving member 12 again be rotated in the direction of directional arrow 50, then the sequence of operation described in connection with the engagement of the apparatus 10, as illustrated in FIGS. 6–9, will again take place.

As mentioned previously, it is important that the spacing of the notches 26 and 28 as well as the keys 36 is such that no two keys 36 can become engaged simultaneously. It is expected that such an occurrence would cause possibly a destructive action as the force transmitted by the driving member 12 would be transmitted throughout the entire carrier plate 14 rather than principally through one of the keys 36. It will also be appreciated that the apparatus 10 could be designed such that two or more keys are engaged simultaneously to permit the driving force to be shared equally therebetween. If such is the case, then it will be appreciated that either the manufacturing tolerances of the notches 26 and 28 will have to be held within very strict limits or the keys 36 will have to be manufactured from some material that allows a slight degree of compression or deformability to compensate for manufacturing variations in the precise positioning of the notches 26 and 28. This would allow each key 36 to make engagement with a respective pair of notches 26 and 28 and to transmit at least a portion of the driving force.

Referring to FIG. 10, an alternative preferred embodiment of the carrier plate 60 of the present invention is shown. The carrier plate 60 is identical to the carrier plate 14 with the exception of raised thrust shoulders 62, 64, 66 and 68 formed on opposing side surfaces 70 and 72 thereof. Since the carrier plate 60 includes thrust shoulders 62–68, neither the driving member 12 nor the driven member 16 need include these shoulders. Accordingly, the thrust shoulders 62–68 will maintain the surfaces 70 and 72 at the proper predetermined distances from the driving member 12 and the driven member 16. It is expected that in some, if not most, applications that the carrier plate 60 will be the preferred form for the carrier plate because it allows the driving member 12 and the driven member 16 to be manufactured more simply.

The various components of the one-way clutch apparatus 10 are preferably manufactured from suitably strong materials for the application with which the apparatus 10 is to be used and the forces to be transmitted through the keys 36. The carrier plate 14 may be manufactured as a stamping or powder metal, or from any suitable friction bearing material. The keys 36 may also be manufactured as stampings, or by extrusion, forming or compaction processes, or plastic molding. Preferably, the thickness of the keys 36 is less than that of the carrier plate 14.

The one-way clutch apparatus 10 of the present invention provides significant advantages over prior one-way (over-running) clutch designs. First, since the keys are mounted for rotational movement within the carrier plate 14, they do not tend to "float" as with prior designs. Thus, the keys 36 are more stable and less likely to become accidentally disengaged as the one-way clutch assumes various orientations relative to the earth's surface, such as might be encountered in land-based vehicle and aircraft applications.

Another significant advantage provided by the apparatus 10 is the reduced criticality of a constant supply of lubricant to the keys 36. With prior designs of one-way clutches, brief, momentary lapses of lubrication such as those that might be encountered as the one-way clutch assumes different attitudes relative to the earth's surface could cause undesirable operational characteristics or significantly accelerated wear and tear. With the apparatus 10, the criticality of a constant source of lubrication to provide proper operation of the keys 36 is reduced. Thus, the keys 36 are considerably less likely to be affected by a brief lapse in lubrication around any engaged key 36.

Referring to FIG. 11, there is shown an apparatus 100 in accordance with an alternative preferred embodiment of the present invention. The apparatus generally comprises a carrier member in the form of an annular carrier ring 102 having at least one cut-out 104 formed therein. Within the cut-out 104 is a key 106 mounted for pivotal movement within the carrier ring 102. The key 106 includes a pair of arm portions 106a extending outwardly therefrom which fit within notches formed in a surface 102a of the carrier ring 102. In the preferred embodiment shown in FIG. 11, it will be noted that the arm portions 106a are formed at the longitudinal center of the key 106. The notches which support the key 106 may be identical to those shown in FIG. 5. Similarly, when the arm portions 106a are formed at the longitudinal center of the key a spring (not shown) such as spring 38 is disposed about at least one of the arm portions 106a to bias the key 106 such that its ends protrude outwardly of the outer surface 102a and an inner surface 102b of the carrier ring 102. The carrier ring 102 is further disposed concentrically between an inner race 108 and an outer race 110, with the inner and outer races 108 and 110, respectively, each being disposed concentrically to one another.

The inner race 108 includes at least one notch 112 formed in an outer surface 114 thereof. Similarly, the outer race 110 has at least one notch 116 formed on an inner surface 118 thereof. The carrier ring 102, inner race 108 and outer race 110 are further disposed so as to be vertically (i.e., laterally) aligned with one another. Any conventional means such as one or more snap rings may be employed to help maintain the outer race 110, inner race 108 and carrier ring 102 laterally aligned with each other. The snap ring(s) may be secured to an external shaft concentrically disposed to all three components 110, 108 and 102 or be may releasably secured to a portion of a housing within which the components 110, 108 and 102 are disposed. It will be appreciated, however, that virtually any device may be used to keep the components 110, 108 and 102 in lateral alignment provided same at least allows rotational movement of the inner race 108 relative to the carrier ring 102, or movement of the outer race 110 relative to the carrier ring 102. Optionally, the inner race 108 may include a plurality of teeth 120 on an inner surface 122 thereof, while the outer race 110 may optionally include a plurality of teeth 124 on an outer surface 126 thereof.

With reference to FIG. 12, an alternative preferred form 107 of the key 106 shown in FIG. 11 is illustrated. The key 107 includes a main body portion 128 and a pair of arm portions 130 projecting outwardly from the main body portion 128. The main body portion 128 is shown as being slightly curved, but it will be appreciated that body portion 128 could function very satisfactorily without such a curvature but rather as a flat member such as that shown in FIG. 11. Both forms are contemplated to be within the scope of the appended claims. With a curved shape, however, the key 107 has more of an ability to deform or compress slightly, especially if formed from a plastic, to thus "cushion" somewhat the engagement with the notches 112 and 116.

In the drawing of FIG. 12 the arm portions 130 are also shown being formed offset from the longitudinal center of the main body portion 128. When offset as shown, the centrifugal force experienced by the carrier ring 102 during operation when the carrier ring 102 is rotated in the locking direction will help bias the ends of the key 107 outwardly to cause the key 107 to lockably engage with the notches 112 and 116 in the inner and outer races 108 and 110, respectively. Should the arm portions 130 be formed at the longitudinal center of the main body portion 128, centrifugal force will not significantly influence (i.e., bias) the main body portion 128 at one or the other of its outermost ends outwardly of the carrier ring 102. In this situation then some form of biasing means such as the coil spring 38 (FIG. 5) is required to maintain the outermost ends 128a and 128b of the main body portion 128 biased outwardly of the carrier ring 102. It will be appreciated that with either key 106 or 107, the arm portions may be substituted for a pin, provided an aperture is formed in the key 106 or 107 where the arm portions 106a or 130 extend. If a pin is included, then apertures will need to be formed through the carrier ring 102 in alignment with the aperture in the key 106 or 107 to allow the key 106 or 107 to be pivotally suspended within the cut-out 104.

Referring to FIG. 13, the carrier ring 102 can be seen vertically aligned with the inner race 108 and the outer race 110. In this embodiment the carrier ring includes an outer surface 132 and an inner surface 134 which act as bearing surfaces relative to the outer race 110 and the inner race 108, respectively. This helps to maintain the concentricity of the inner race 108, the carrier ring 102 and the outer race 110.

Referring now to FIG. 14, an alternative preferred form of construction 136 of the apparatus is shown. In this embodiment the carrier ring 102 of FIG. 11 is disposed concentrically between an inner race 138 and an outer race 140. The inner race 138 includes an annular shoulder portion 138a while the outer race 140 includes a similar annular shoulder portion 140a. The carrier ring 102 is disposed concentrically between the inner and outer races 138 and 140, respectively, and is further maintained laterally aligned between side portions 138b of the inner race 138 and side portions 140b of the outer race 140 by the shoulder portions 138a and 140a. In this embodiment the inner race 138 and outer race 140 each act as a bearing surface to help maintain the carrier ring 102 concentrically and laterally aligned therebetween.

With either of the embodiments 100 or 136, the key used therewith may be generally flat or curved. If curved, the degree of curvature may be adjusted to the application such that the curvature can facilitate slight elastic bending to reduce impact loads as the key 106 engages. The curvature can also allow for some elastic behavior to compensate for manufacturing tolerances should multiple keys be used about the carrier ring 102, to thus further ensure that all of the keys engage substantially simultaneously. Manufacturing the key 106 or 107 from high strength plastic may also add to the elasticity of the key if this characteristic is desired.

Referring again to FIG. 11, the operation of the apparatus 100 will be described. Initially, in some applications it may be desirable to lock the carrier ring 102 to either the inner race 108 or the outer race 110. For the purposes of illustration only, it will be assumed that the carrier ring 102 is not locked to either the inner race 108 or the outer race 110 but is free to move independently therebetween. It should be appreciated however, that each embodiment of the apparatus 100 may be configured to rotate independent of both the inner and outer races 108 and 110 in a free-wheeling direction, or fixed to rotate with one or the other of the races 108 and 110, depending on the requirements of a particular application.

When the outer race 110 is moving clockwise relative to the carrier ring 102, there is no engagement of the key 106 with any of the notches 116. In this instance the outer race 110 is said to be rotating in the "over-running" direction and such rotational movement does not cause any engagement of the carrier ring 102 therewith nor any engagement with the inner race 108. Thus, the outer race 110 rotates without driving either the carrier ring 102 or the inner race 108.

When the outer race 110 is rotated in the opposite direction (i.e., counterclockwise), an outer end portion 106b of the key 106 is biased into one of the notches 116 thus engaging therein. As the outer race 110 continues to rotate counterclockwise in the drawing of FIG. 11, it moves the carrier ring with it a very short distance before the opposite outer end portion 106c of the key 106 engages in one of the notches 112 in the inner race 108. After this point, continued rotation of the outer race 110 in the counterclockwise direction drives the carrier ring 102 and the inner race 108 simultaneously in the counterclockwise direction therewith. If the outer race 110 is thereafter rotated in the clockwise direction, the key 106 will ride out of the notches 116 and 112 due to the slope of wall portions 112a and 116a of the notches 11. The operation of embodiment 136 shown in FIG. 14 is identical to that of the embodiment 100 shown in FIG. 11.

If the key 106 is constructed such that its arm portions 130 are offset from the longitudinal center, as described in connection with FIG. 12, then the carrier ring 102 may be used as the driving member to cause driving engagement with either, or both, of the inner race 108 and the outer race 110. Engagement is effected by the centrifugal force experienced by the key 106 when the carrier ring 102 is rotated in the direction which causes outermost end portion 128a (FIG. 12) to be urged outwardly of the carrier ring 102. In this fashion one or more concentrically disposed races can be driven by the carrier ring 102.

With either form of key 106 or 107 engagement with one or both of the inner race 108 and outer race 110 is maintained by either the centrifugal force experienced by the key, which tends to keep it biased outwardly of the carrier ring 102, or the biasing force provided by a spring associated with the key 106 or 107. Thus, once engaged, the key remains engaged unless the direction of either the inner race 108 or the outer race 110, or both, is changed to the over-running direction.

While the above description constitutes the preferred embodiment of the invention, it will be appreciated that the invention is susceptible to modification, clarification, and change without departing from the proper scope or fair meaning of the accompanying claims.

What is claimed:

1. A one-way clutch apparatus comprising:

a driving member;

a driven member;

said driving member and said driven member each have a plurality of key engaging portions;

a carrier ring means having first and second oppositely facing and generally planar surfaces disposed coaxially between said driving member and said driven member for coupling said driving member to said driven member when said driving member is moved in a first rotational direction, and for uncoupling said driven member from said driving member when said driving member is moved in a second rotational direction opposite to said first rotational direction;

at least one key operably associated with said carrier ring and moveable pivotally relative to said carrier ring about an axis extending generally perpendicular to an axis of rotation of said carrier ring for engaging said key engaging portions, said key including first and second ends that project outwardly of said first and second generally planar surfaces when said key is engaged with said key engaging portions of said driving and said driven member; and wherein when said driving member is moved in said first rotational direction said first end of said key engages said key engaging portion in said driving member, thereby causing said carrier ring to be driven rotationally with said driving member, and wherein said second end of said key thereafter engages with said key engaging portion of said driven member, thus causing said driven member to be driven in said first direction of rotation together with said driving member and said key; and when said driving member is rotated in said second rotational direction said key is urged out of engagement with said key engaging portion of said driving member, thereby allowing said driving member to rotate freely in an over-running condition in said second rotational direction.

2. The apparatus of claim 1, further comprising:

biasing associated with said key to cause said key to be constantly biased such that said key tends to rotate about said axis, to thereby cause said first and second ends of said key to be biased outwardly of said carrier ring.

3. The apparatus of claim 1, wherein said key comprises a rectangular key having a pair of arms protruding outwardly therefrom.

4. The apparatus of claim 1 wherein said carrier ring includes a cut-out portion having dimensions sufficient to allow said key to be disposed substantially therein.

5. The apparatus of claim 1, wherein said carrier ring includes a plurality of keys positioned about an outer periphery of said carrier ring.

6. The apparatus of claim 1, wherein said key comprises a generally rectangular key having a pair of arm portions protruding outwardly therefrom, said arm portions being offset from a longitudinal center of said main body portion.

7. A one-way clutch comprising:

a driving member having at least one notch formed therein;

a driven member positioned generally concentrically with said driving member and having at least one notch formed therein;

a carrier ring having generally planar first and second oppositely facing surfaces disposed concentrically with said driving member and said driven member between said driving member and said driven member, said carrier ring including at least one cut-out therein;

a key disposed in said carrier ring, said key having a main body portion having first and second outer ends and an axis of rotation about which said first and second ends are adapted to rotate pivotally, said axis of rotation of said key being generally perpendicular to the axis of rotation of said carrier ring and a pair of arm portions projecting outwardly of said main body portion for supporting said main body portion pivotally within said cut-out;

said carrier ring including means for supporting said key within said cut-out such that said key can rotate pivotally within said carrier ring;

one of said outer ends of said key being operable to engage said driven member when said carrier ring is rotated in a first direction;

said key being uncoupled with said driven member when said carrier ring is rotated in a second rotational direction opposite to said first rotational direction; and when said key is uncoupled with said driven member said key is disposed within said carrier ring such that said main body portion thereof is substantially flush with said generally planar first and second surfaces.

8. A new-way clutch comprising:

a driving member having a generally planar surface having key engaging portion formed therein;

a driven member having a generally planar surface having a key engaging portion formed therein;

a carrier ring having generally planar first and second surfaces and a cut-out formed therein;

a key disposed with said cut-out and movably pivotally about an axis of rotation extending perpendicular to an axis of rotation of said carrier ring; and said key operating to move pivotally to engage said key engaging portions of said driven and said driving members when said driving member is moved in a first rotational direction and to disengage said key engaging portions to allow said driving member to free-wheel relative to said carrier ring when said driving member is moved in a second rotational direction opposite to said first rotational direction.

* * * * *

UNITED STATES PATENT AND TRADEMARK OFFICE
CERTIFICATE OF CORRECTION

PATENT NO. : 5,449,057

DATED : September 12, 1995

INVENTOR(S) : Arthur R. Frank

It is certified that error appears in the above-identified patent and that said Letters Patent is hereby corrected as shown below:

Col. 4, line 16, "wings" should be --drawings--

Col. 5, Line 11, "disc" should be --disk--

Col. 5, Line 53, first occurrence of "26b" should be --26a--

Col. 10, Line 59, "be may" should be --may be--

Col. 13, Line 15, Claim 1, delete "means"

Col. 14, Line 46, Claim 8, "new way" should be --one-way--

Signed and Sealed this

Fourth Day of June, 1996

*Attest:*

BRUCE LEHMAN

*Attesting Officer*    *Commissioner of Patents and Trademarks*